(12) United States Patent
Lee et al.

(10) Patent No.: US 11,859,038 B2
(45) Date of Patent: Jan. 2, 2024

(54) METHOD FOR MANUFACTURING A BLOCK COPOLYMER OF POLYAMIDE ACID

(71) Applicant: Zhen Ding Technology Co., Ltd., Taoyuan (TW)

(72) Inventors: Kuan-Wei Lee, Taoyuan (TW); Szu-Hsiang Su, Taoyuan (TW); Shou-Jui Hsiang, Tayuan (TW); Pei-Jung Wu, Taoyuan (TW); Wei-Hsin Huang, Taoyuan (TW)

(73) Assignee: Zhen Ding Technology Co., Ltd., Taoyuan (TW)

( * ) Notice: Subject to any disclaimer, the term of this patent is extended or adjusted under 35 U.S.C. 154(b) by 452 days.

(21) Appl. No.: 16/936,204

(22) Filed: Jul. 22, 2020

(65) Prior Publication Data
US 2021/0087319 A1   Mar. 25, 2021

(30) Foreign Application Priority Data
Sep. 19, 2019   (CN) .......................... 201910886468.8

(51) Int. Cl.
*C08J 5/18*   (2006.01)
*C08F 293/00*   (2006.01)

(52) U.S. Cl.
CPC .............. *C08F 293/00* (2013.01); *C08J 5/18* (2013.01); *C08J 2377/06* (2013.01)

(58) Field of Classification Search
CPC ......... C08J 2379/08; C08J 5/18; C08L 79/08; C08L 83/10; C08G 73/1071; C08G 73/1078
See application file for complete search history.

(56) References Cited

U.S. PATENT DOCUMENTS

| | | | |
|---|---|---|---|
| 2017/0165879 A1* | 6/2017 | Miyamoto | C23C 16/345 |
| 2019/0128482 A1* | 5/2019 | Jiang | H05B 45/345 |
| 2020/0216614 A1 | 7/2020 | Auman et al. | |

FOREIGN PATENT DOCUMENTS

| | | |
|---|---|---|
| TW | 201531526 A | 8/2015 |
| TW | 201920369 A | 6/2019 |

OTHER PUBLICATIONS

Yoshiyuki Oishi et al "Preparation and Properties of Molecular Composite Films of Block Copolyimides Based on Rigid Rod and Semi-Flexible Segments", Polymer Journal, vol. 21, No. IO, pp. 771-780 (1989) (Year: 1989).*

(Continued)

*Primary Examiner* — Gregory Listvoyb
(74) *Attorney, Agent, or Firm* — ScienBiziP, P.C.

(57) ABSTRACT

A block copolymer of polyamide acid includes a first polyamide acid and a second polyamide acid alternately connected. The first polyamide acid is made by first dianhydride monomers and second diamine monomers. The second polyamide acid is made by second dianhydride monomers and first diamine monomers. Each first dianhydride monomer is

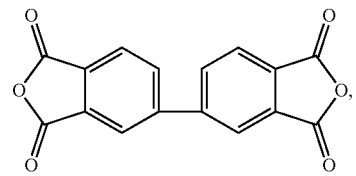

or comprises a liquid crystal structure. Each second dianhydride monomer and each second diamine monomer respectively include a first flexible structure. Each first diamine monomer includes a liquid crystal structure. Each liquid crystal structure includes a cyclic group selected from a chemical structural formula of

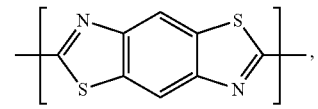

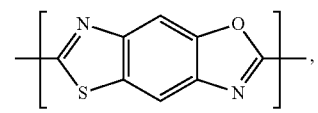

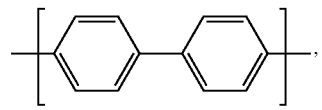

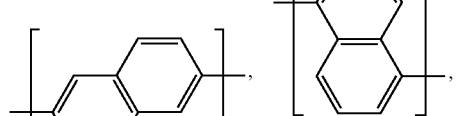

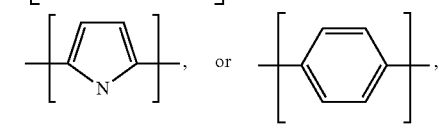

and intermediate groups selected from a chemical structural formula of (Continued)

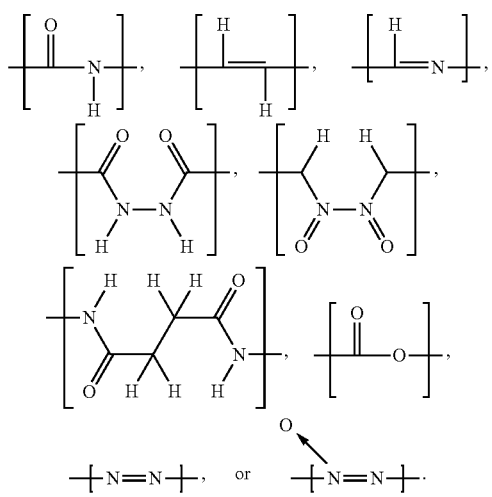

Each flexible structure includes a group selected from a group consist of ether bond, ketone group, sulphone group, aliphatic hydrocarbon group, and any combination thereof.

2 Claims, 4 Drawing Sheets

(56) References Cited

OTHER PUBLICATIONS

Tong et al "Poiyimides From isomeric Biphenyltetracarboxylic Dianhydrides and the Effects of Chemical Structure on Solubility", Polymer Engineering and Science, Jan. 2002, vol. 42, No. 1 (Year: 2002).*

Yanfeng Liu et al "Thermal and Mechanical Properties of Phenylethynyl-Containing Imide Oligomers Based on Isomeric Biphenyltetracarboxylic Dianhydrides", High Performance Polymers, 22: 95-108, 2010 (Year: 2010).*

* cited by examiner

METHOD FOR MANUFACTURING A BLOCK COPOLYMER OF POLYAMIDE ACID

FIELD

The subject matter herein generally relates to a block copolymer of polyamide acid, a polyimide film, a method for manufacturing the block copolymer of polyamide acid.

BACKGROUND

Circuit boards usually include polyimide films. The polyimide film is applied in the circuit board to bond with the metal layer. A peel strength of the polyimide film cannot satisfy the demand of new products.

Therefore, there is room for improvement within the art.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
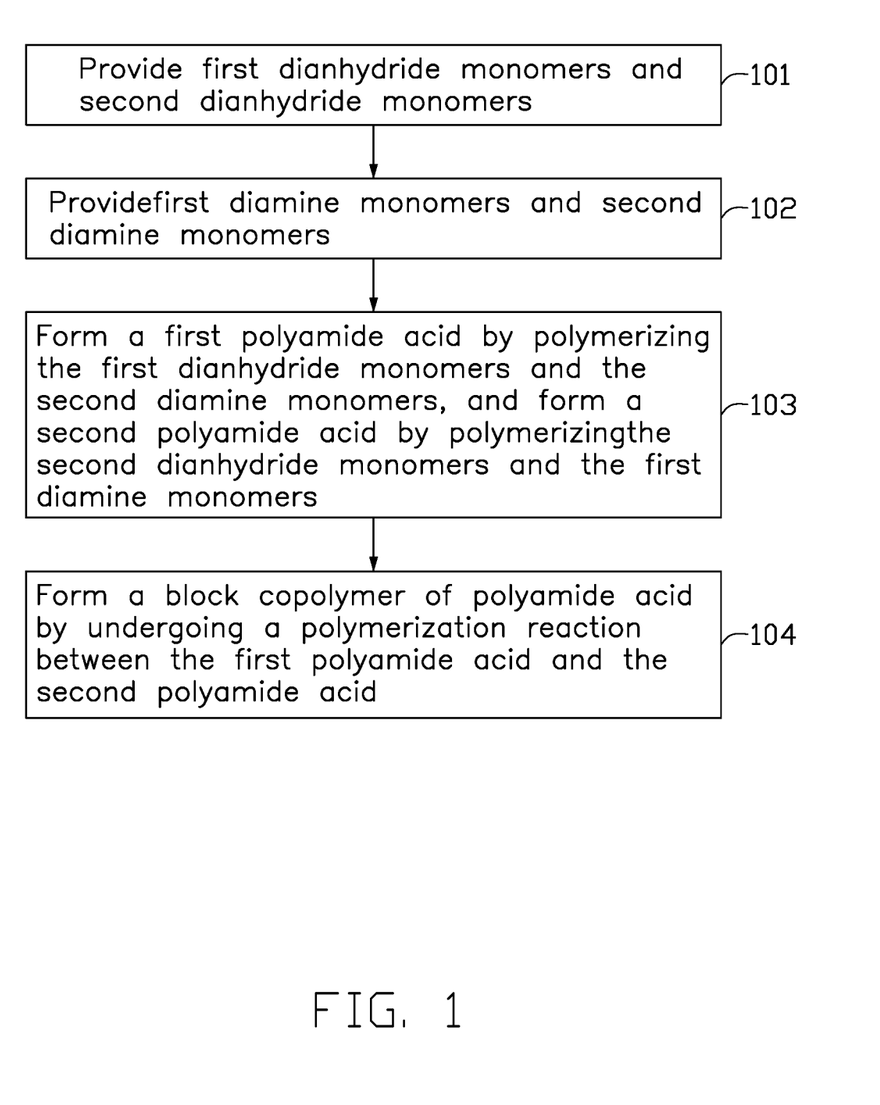
FIG. 1 is a flowchart of an embodiment of a method for manufacturing a block copolymer of polyamide acid.

FIG. 1 illustrates a flowchart of a method in accordance with an embodiment. The method for manufacturing a block copolymer of polyamide acid is provided by way of embodiments, as there are a variety of ways to carry out the method. Each block shown in FIG. 1 represents one or more processes, methods, or subroutines carried out in the method. Furthermore, the illustrated order of blocks can be changed. Additional blocks may be added or fewer blocks may be utilized, without departing from this disclosure. The method can begin at block 101.

At block 101, first dianhydride monomers and second dianhydride monomers are provided. Each dianhydride monomer has a chemical structural formula of or includes a first liquid crystal structure between two phthalic anhydride groups. A main chain of the first liquid crystal structure includes at least one first cyclic group and at least two first intermediate groups. Each first intermediate group is provided between the first cyclic group and the phthalic anhydride group adjacent to the first cyclic group, or between two adjacent first cyclic groups. Each first intermediate group is selected from a chemical structural formula of

Each first cyclic group is selected from a chemical structural formula of

Each second dianhydride monomer includes a first flexible structure between two phthalic anhydride groups. A main chain of the first flexible structure includes a group selected from a group consist of ether bond ketone group sulphone group aliphatic hydrocarbon group, and any combination thereof.

In at least one embodiment, each first dianhydride monomer may be 3,3',4,4'-biphenyltetracarboxylic dianhydride having a chemical structural formula of p-phenylene bis(trimellitate) dianhydride having a chemical structural formula of or cyclohexane-1,4-diylbis(methylene)bis(1,3-dioxo-1,3-dihy-droisobenzofuran-5-carboxylate) having a chemical structural formula of

In at least one embodiment, each second dianhydride monomer may be bis-(3-phthalyl anhydride) ether having a chemical structural formula of

4-[(1,3-dihydro-1,3-dioxo-5-isobenzofuranyl)oxy]-1,3-isobenzofurandione having a chemical structural formula of

3,3',4,4'-benzophenonetetracarboxylic dianhydride having a chemical structural formula of

3,3',4,4'-diphenyl sulfonetetracarboxylic anhydride having a chemical structural formula of

4,4'-(hexafluoroisoproylidene)diphthalic anhydride having a chemical structural formula of or 4,4'-(4,4'-isopropylidenediphenoxybis(phthalic anhydride) having a chemical structural formula of

At block 102, first diamine monomers and second diamine monomers are provided. Each first diamine monomer includes a second liquid crystal structure between two phenyl groups with amino. A main chain of the second liquid crystal structure includes a second intermediate group or includes at least one second cyclic group and at least two second intermediate groups. Each second intermediate group is provided between the phenyl groups with amino, between the second cyclic group and the phenyl groups with amino adjacent to the second cyclic group, or between two adjacent second cyclic groups. Each second intermediate group is selected from a chemical structural formula of

Each second cyclic group is selected from a chemical structural formula of

Each second diamine monomer includes a second flexible structure between two phenyl groups with amino. A main chain of the second flexible structure includes a group selected from a group consist of ether bond ketone group sulphone group aliphatic hydrocarbon group, and any combination thereof.

In at least one embodiment, each first diamine monomer may be 4-aminophenyl-4-aminobenzoate having a chemical structural formula of bis(4-aminophenyl)terephthalate having a chemical structural formula of or [4-(4-aminobenzoyl)oxyphenyl] 4-aminobenzoate having a chemical structural formula of

In at least one embodiment, each second diamine monomer may be 4,4'-oxydianiline having a chemical structural formula of

4,4'-(4,4'-isopropylidenediphenyl-1,1'-diyldioxy)daniline having a chemical structural formula of

2,2-bis[4-(4-aminophenoxy)phenyl]hexafluoropropane having a chemical structural formula of 4,4'-(1,3-phenylenedioxy)dianiline having a chemical structural formula of or 1,3-bis(3-aminophenoxy)benzene having a chemical structural formula of At block 103, the first dianhydride monomers and the second diamine monomers are mixed and polymerized to form a first polyamide acid, and the second dianhydride monomers and the first diamine monomers are mixed and polymerized to form a second polyamide acid.

In at least one embodiment, the first liquid crystal structure included in the first dianhydride monomer and the second liquid crystal structure included in the first diamine monomer may be the same or be different. The first flexible structure in the second dianhydride monomer and the second flexible structure included in the second diamine monomer may be the same or be different.

In at least one embodiment, the first dianhydride monomers, the second diamine monomers and a first solvent are mixed to obtain a first mixture, and the first dianhydride monomers and the second diamine monomers are dissolved in the first solvent. The first solvent is a bipolar aprotic solvent. In at least one embodiment, the first solvent may be selected from a group consist of dimethylformamide (DMF), dimethylacetamide (DMAC), N-methylpyrrolidone (NMP), dimethylsulfoxide, and any combination thereof. In at least one embodiment, in the first mixture, a mass percentage of the first solvent is in a range of 75% to 85%.

In at least one embodiment, the second dianhydride monomers, the first diamine monomers and a second solvent are mixed to obtain a second mixture, and the second dianhydride monomers and the first diamine monomers are dissolved in the second solvent. The second solvent is a bipolar aprotic solvent. In at least one embodiment, the second solvent may be selected from a group consist of dimethylformamide (DMF), dimethylacetamide (DMAC), N-methylpyrrolidone (NMP), dimethylsulfoxide, and any combination thereof. In at least one embodiment, in the second mixture, a mass percentage of the second solvent is in a range of 75% to 85%.

In at least one embodiment, the first dianhydride monomers and the second diamine monomers may be in a molar ratio of 9:10 to 11:10. In at least one embodiment, the second dianhydride monomers and the first diamine monomers may be in a molar ratio of 9:10 to 11:10.

At block 104, the first polyamide acid and the second polyamide acid undergo a polymerization reaction to obtain the block copolymer of polyamide acid.

In the block copolymer of polyamide acid, the first polyamide acid and the second polyamide acid are alternately connected. In the first polyamide acid, the first liquid crystal structure and the second flexible structure are alternately arranged. In the second polyamide acid, the first flexible structure and the second liquid crystal structure are alternately arranged.

Figure 2:
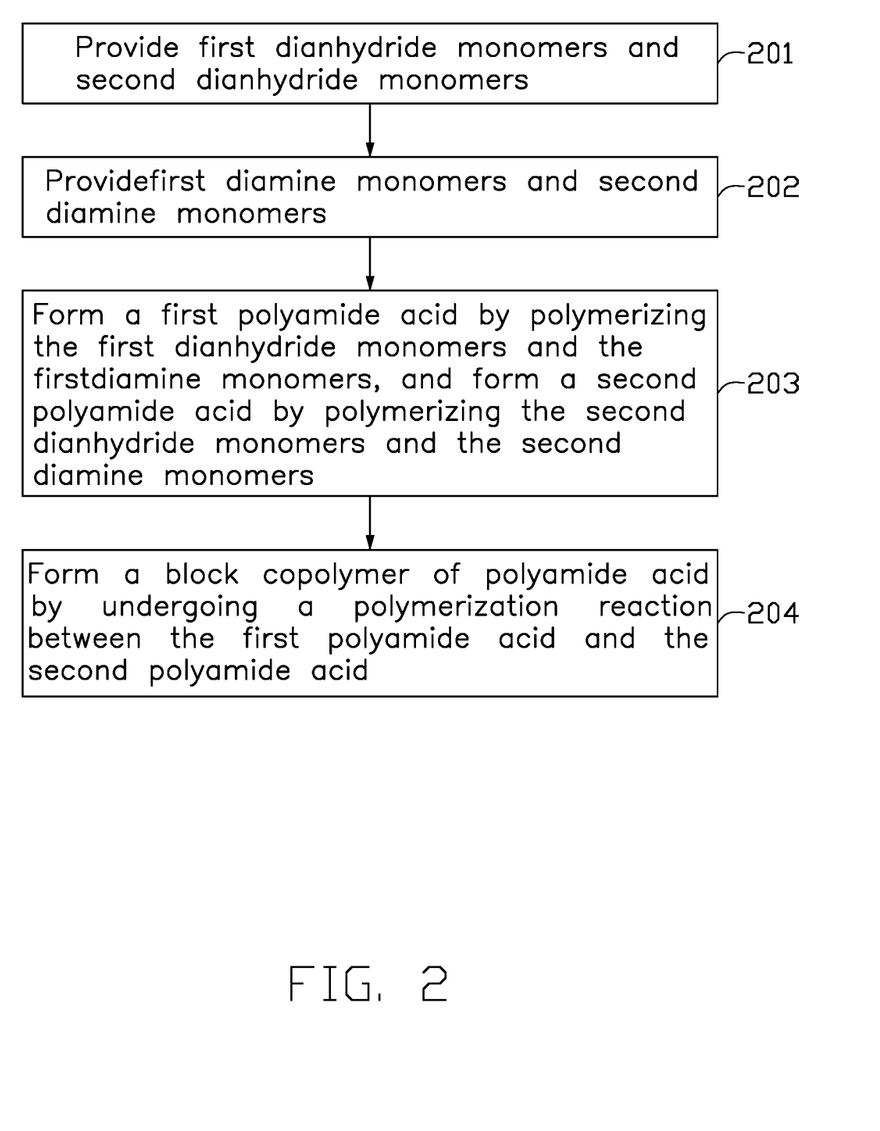
FIG. 2 is a flowchart of another embodiment of a method for manufacturing a block copolymer of polyamide acid

FIG. 2 illustrates a flowchart of a method in accordance with another embodiment. The method for manufacturing a block copolymer of polyamide acid is provided by way of embodiments, as there are a variety of ways to carry out the method. Each block shown in FIG. 2 represents one or more processes, methods, or subroutines carried out in the method. Furthermore, the illustrated order of blocks can be changed. Additional blocks may be added or fewer blocks may be utilized, without departing from this disclosure. The method can begin at block 201.

At block 201, first dianhydride monomers and second dianhydride monomers are provided. Each dianhydride monomer has a chemical structural formula of or includes a first liquid crystal structure between two phthalic anhydride groups. A main chain of the first liquid crystal structure includes at least one first cyclic group and at least two first intermediate groups. Each first intermediate group is provided between the first cyclic group and the phthalic anhydride group adjacent to the first cyclic group, or between two adjacent first cyclic groups. Each first intermediate group is selected from a chemical structural formula of

Each first cyclic group is selected from a chemical structural formula of

Each second dianhydride monomer includes a first flexible structure between two phthalic anhydride groups. A main chain of the first flexible structure includes a group selected from a group consist of ether bond ketone group sulphone group aliphatic hydrocarbon group, and any combination thereof.

In at least one embodiment, each first dianhydride monomer may be 3,3',4,4'-Biphenyltetracarboxylic dianhydride having a chemical structural formula of p-Phenylene bis(trimellitate) dianhydride having a chemical structural formula of or cyclohexane-1,4-diylbis(methylene)bis(1,3-dioxo-1,3-dihy-droisobenzofuran-5-carboxy late) having a chemical structural formula of

In at least one embodiment, each second dianhydride monomer may be bis-(3-phthalyl anhydride) ether having a chemical structural formula of

4-[(1,3-Dihydro-1,3-dioxo-5-isobenzofuranyl)oxy]-1,3-isobenzofurandione having a chemical structural formula of

3,3',4,4'-Benzophenonetetracarboxylic dianhydride having a chemical structural formula of

3,3',4,4'-Diphenyl sulfonetetracarboxylic anhydride having a chemical structural formula of 4,4'-(Hexafluoroisoproylidene)diphthalic anhydride having a chemical structural formula of or 4,4'-(4,4'-Isopropylidenediphenoxybis(phthalic anhydride) having a chemical structural formula of

At block 202, first diamine monomers and second diamine monomers are provided. Each first diamine monomer includes a second liquid crystal structure between two phenyl groups with amino. A main chain of the second liquid crystal structure includes a second intermediate group or includes at least one second cyclic group and at least two second intermediate groups. Each second intermediate group is provided between the phenyl groups with amino, between the second cyclic group and the phenyl groups with amino adjacent to the second cyclic group, or between two adjacent second cyclic groups. Each second intermediate group is selected from a chemical structural formula of

Each cyclic group is selected from a chemical structural formula of

Each second diamine monomer includes a second flexible structure between two phenyl groups with amino. A main chain of the second flexible structure includes a group selected from a group consist of ether bond ketone group sulphone group aliphatic hydrocarbon group, and any combination thereof.

In at least one embodiment, each first diamine monomer may be 4-Aminobenzoic acid 4-aminophenyl ester having a chemical structural formula of

Bis(4-aminophenyl)terephthalate having a chemical structural formula of or [4-(4-aminobenzoyl)oxyphenyl] 4-aminobenzoate having a chemical structural formula of

In at least one embodiment, each second diamine monomer may be 4,4'-Oxydianiline having a chemical structural formula of

4,4'-(4,4'-Isopropylidenediphenyl-1,1'-diyldioxy)dianiline having a chemical structural formula of

2,2-Bis[4-(4-aminophenoxy)phenyl]hexafluoropropane having a chemical structural formula of 4,4'-(1,3-Phenylenedioxy)dianiline having a chemical structural formula of or 1,3-Bis(3-aminophenoxy)benzene having a chemical structural formula of At block 203, the first dianhydride monomers and the first diamine monomers are mixed and polymerized to form a first polyamide acid, and the second dianhydride monomers and the second diamine monomers are mixed and polymerized to form a second polyamide acid.

In at least one embodiment, the first liquid crystal structure included in the first dianhydride monomer and the second liquid crystal structure included in the first diamine monomer may be the same or be different. The first flexible structure in the second dianhydride monomer and the second flexible structure included in the second diamine monomer may be the same or be different.

In at least one embodiment, the first dianhydride monomers, the first diamine monomers and a first solvent are mixed to obtain a first mixture, and the first dianhydride monomers and the first diamine monomers are dissolved in the first solvent. The first solvent is a bipolar aprotic solvent. In at least one embodiment, the first solvent may be selected from a group consist of dimethylformamide (DMF), dimethylacetamide (DMAC), N-methylpyrrolidone (NMP), dimethylsulfoxide, and any combination thereof. In at least one embodiment, in the first mixture, a mass percentage of the first solvent is in a range of 75% to 85%.

In at least one embodiment, the second dianhydride monomers, the second diamine monomers and a second solvent are mixed to obtain a second mixture, and the second dianhydride monomers and the second diamine monomers are dissolved in the second solvent. The second solvent is a bipolar aprotic solvent. In at least one embodiment, the second solvent may be selected from a group consist of dimethylformamide (DMF), dimethylacetamide (DMAC), N-methylpyrrolidone (NMP), dimethylsulfoxide, and any combination thereof. In at least one embodiment, in the second mixture, a mass percentage of the second solvent is in a range of 75% to 85%.

In at least one embodiment, the first dianhydride monomers and the first diamine monomers may be in a molar ratio of 9:10 to 11:10. In at least one embodiment, the second dianhydride monomers and the second diamine monomers may be in a molar ratio of 9:10 to 11:10.

At block 204, the first polyamide acid and the second polyamide acid are mixed and undergo a polymerization reaction to obtain the block copolymer of polyamide acid.

In the block copolymer of polyamide acid, the first polyamide acid and the second polyamide acid are alternately connected. In the first polyamide acid, the first liquid crystal structure and the second liquid crystal structure are alternately arranged. In the second polyamide acid, the first flexible structure and the second flexible structure are alternately arranged.

Figure 3:
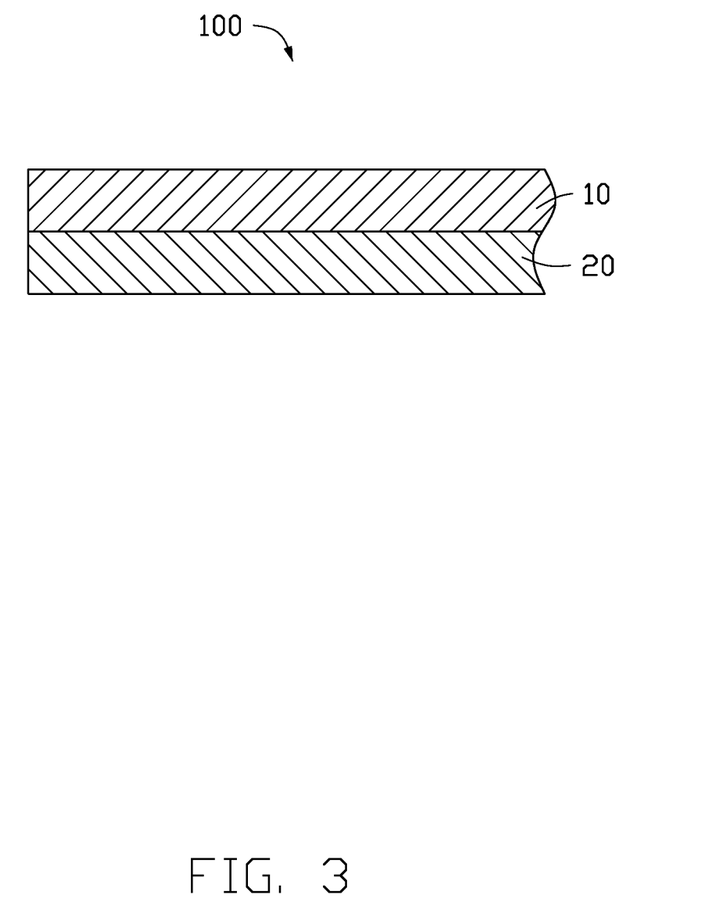
FIG. 3 is a diagram of an embodiment of a metal clad laminate.

FIG. 3 illustrates an embodiment of a metal clad laminate 100. The metal clad laminate 100 may be applied to a circuit board 200 (shown in FIG. 4). The metal clad laminate 100 includes a metal foil 10 and a polyimide film 20 bonded to a surface of the metal foil 10. The polyimide film 20 is formed by coating the above block copolymer of polyamide acid on the surface of the metal foil 10 and then cyclizing the coated block copolymer of polyamide acid by heating.

In at least one embodiment, the polyimide film made by the following step:

Wherein Ar1 represents a group, and Ar2 represents a group.

In at least one embodiment, a temperature of cyclizing the coated block copolymer of polyamide acid is in a range of 300 degrees Celsius to 400 degrees Celsius.

In at least one embodiment, a surface roughness of the metal foil 10 is in a range of 0.12 μm to 2.1 μm.

When the block copolymer of polyamide acid includes nitrogen heterocycle, nitrogen atoms of the nitrogen heterocycle may coordinate with the metal foil 10, thereby improving a binding force between the polyimide film 20 and the metal foil 10. So that when the metal foil 100 with a low surface roughness is used to make metal clad laminate 100, the polyimide film 20 formed on the metal foil 100 may be flat, and a transmittance of the polyimide film 20 may be improved.

Figure 4:
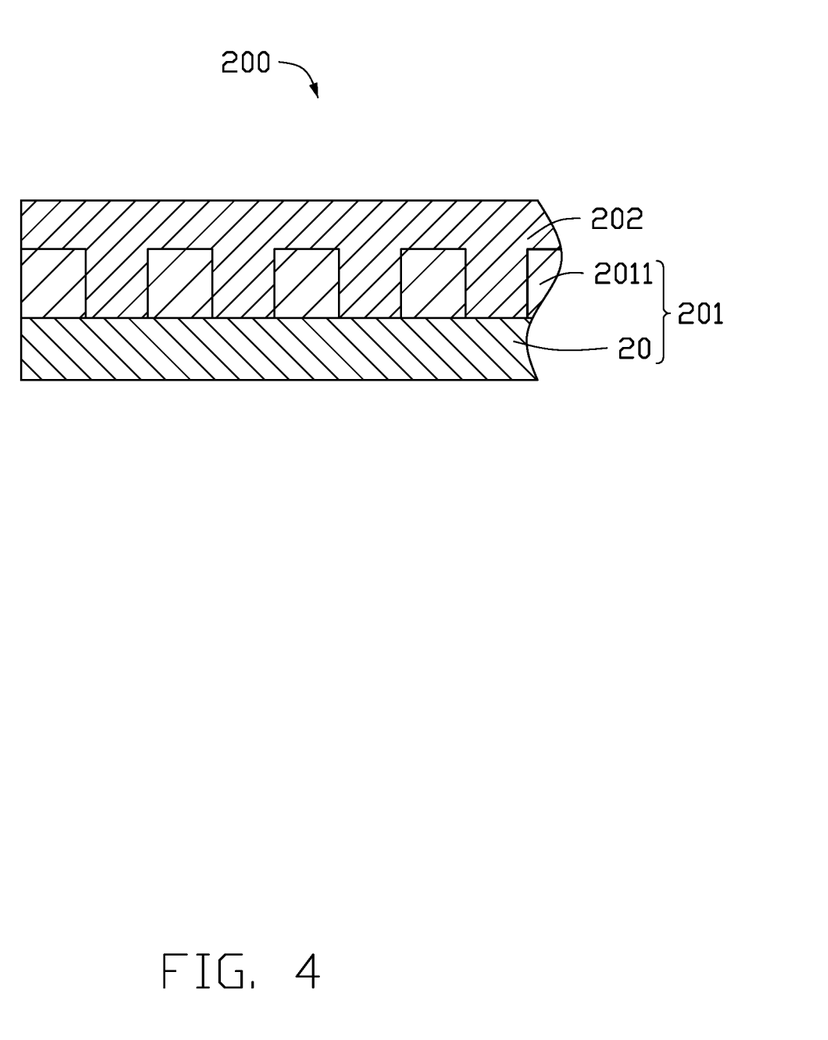
FIG. 4 is a diagram of an embodiment of a circuit board.

The circuit board 200 may be applied to electronic devices (not shown), such as computers, e-readers, pads, or smart watches. In at least one embodiment, the circuit board 200 includes a circuit substrate 201 and a covering film 202 on the circuit substrate 201. The circuit board 201 includes a polyimide film 20 and a conductive wiring layer 2011 bonded to the polyimide film 20.

Example 1

211.10 g of N-methylpyrrolidone, 11.41 g or 0.05 mol of 4-Aminobenzoic acid 4-aminophenyl ester (APAB) were added into a container and stirred until dissolved. 15.51 g or 0.05 mol of bis-(3-phthalyl anhydride) ether (ODPA) was added into the container and stirred for 1 hour to react. 14.62 g or 0.05 mol of 1,3-Bis(3-aminophenoxy)benzene (TPE-M) was added into the container and stirred until dissolved. 22.93 g or 0.05 mol of p-Phenylene bis(trimellitate) dianhydride (TAHQ) was added into the container and stirred for 48 hours to react, thereby obtaining a block copolymer of polyamide acid.

Example 2

209.14 g of N-methylpyrrolidone, 11.41 g or 0.05 mol of 4-Aminobenzoic acid 4-aminophenyl ester were added into a container and stirred to be dissolved. 7.76 g or 0.025 mol of bis-(3-phthalyl anhydride) ether and 13.01 g or 0.025 mol of 4,4'-(4,4'-Isopropylidenediphenoxybis(phthalic anhydride)(BPADA) were added into the container and stirred for 1 hour to react. 14.62 g or 0.05 mol of 1,3-Bis(3-aminophenoxy)benzene was added into the container and stirred until dissolved. 22.93 g or 0.05 mol of p-Phenylene bis(trimellitate) dianhydride was added into the container and stirred for 48 hours to react thereby obtaining a block copolymer of polyamide acid.

Example 3

224.91 g of N-methylpyrrolidone, 1.41 g or 0.05 mol of 4-Aminobenzoic acid 4-aminophenyl ester were added into a container and stirred until dissolved. 26.02 g or 0.05 mol of 4,4'-(4,4'-Isopropylidenediphenoxybis(phthalic anhydride) was added into the container and stirred for 1 hour to react. 14.62 g or 0.05 mol of 1,3-Bis(3-aminophenoxy)benzene was added into the container and stirred until dissolved. 22.93 g or 0.05 mol of p-Phenylene bis(trimellitate) dianhydride was added into the container and stirred for 48 hours to react, thereby obtaining a block copolymer of polyamide acid.

Example 4

233.92 g of N-methylpyrrolidone, 5.71 g or 0.025 mol of 4-Aminobenzoic acid 4-aminophenyl ester, and 8.71 g or 0.025 mol of Bis(4-aminophenyl)terephthalate (BPTP) were added into a container and stirred until dissolved. 26.02 g or 0.05 mol of 4,4'-(4,4'-Isopropylidenediphenoxybis(phthalic anhydride) was added into the container and stirred for 1 hour to react. 14.62 g or 0.05 mol of 1,3-Bis(3-aminophenoxy)benzene was added into the container and stirred until dissolved. 22.93 g or 0.05 mol of p-Phenylene bis(trimellitate) dianhydride was added into the second container and stirred for 48 hour to react, thereby obtaining a block copolymer of polyamide acid.

Example 5

246.68 g of N-methylpyrrolidone, 5.71 g or 0.025 mol of 4-Aminobenzoic acid 4-aminophenyl ester, and 12.96 g or 0.025 mol of 2,2-Bis[4-(4-aminophenoxy)phenyl]hexafluoropropane (HFBAPP) were added into a container and stirred until dissolved. 26.02 g or 0.05 mol of 4,4'-(4,4'-Isopropylidenediphenoxybis(phthalic anhydride) was added into the container and stirred for 1 hour to react. 14.62 g or 0.05 mol of 1,3-Bis(3-aminophenoxy)benzene was added into the container and stirred until dissolved. 22.93 g or 0.05 mol of p-Phenylene bis(trimellitate) dianhydride was added into the container and stirred for 48 hours to react, thereby obtaining a block copolymer of polyamide acid.

Comparative Example 1

260.76 g of N-methylpyrrolidone, 41.05 g or 0.1 mol of 4,4'-(4,4'-Isopropylidenediphenyl-1,1'-diyldioxy)dianiline (BAPP) were added into a container and stirred until dissolved. 45.87 g or 0.1 mol of p-Phenylene bis(trimellitate) dianhydride was added into the container and stirred for 48 hour to react, thereby obtaining a block copolymer of polyamide acid.

Comparative Example 2

227.29 g of N-methylpyrrolidone, 11.41 g or 0.05 mol of 4-Aminobenzoic acid 4-aminophenyl ester were added into a container and stirred until dissolved. 22.93 g or 0.05 mol of p-Phenylene bis(trimellitate) dianhydride was added into the container and stirred for 1 hour to react. 25.92 g or 0.05 mol of 2,2-Bis[4-(4-aminophenoxy)phenyl]hexafluoropropane was added into the container and stirred until dissolved. 15.51 g or 0.05 mol of bis-(3-phthalyl anhydride) ether was added into the container and stirred for 48 hours to react, thereby obtaining a block copolymer of polyamide acid.

Comparative Example 3

211.10 g of N-methylpyrrolidone, 11.41 g or 0.05 mol of 4-Aminobenzoic acid 4-aminophenyl ester were added into a container and stirred until dissolved. 22.93 g or 0.05 mol of p-Phenylene bis(trimellitate) dianhydride was added into the container and stirred for 1 hour to react. 20.53 g or 0.05 mol of 4,4'-(4,4'-Isopropylidenediphenyl-1,1'-diyldioxy)dianiline was added into the container and stirred until dissolved. 15.51 g or 0.05 mol of bis-(3-phthalyl anhydride) ether was added into the container and stirred for 48 hours to react, thereby obtaining a block copolymer of polyamide acid.

Comparative Example 4

211.10 g of N-methylpyrrolidone, 11.41 g or 0.05 mol of 4-Aminobenzoic acid 4-aminophenyl ester were added into a container and stirred until dissolved. 22.93 g or 0.05 mol of p-Phenylene bis(trimellitate) dianhydride was added into the container and stirred for 1 hour to react. 14.62 g or 0.05 mol of 1,3-Bis(3-aminophenoxy)benzene was added into the container and stirred until dissolved. 15.51 g or 0.05 mol of bis-(3-phthalyl anhydride) ether was added into the container and stirred for 48 hours to react, thereby obtaining a block copolymer of polyamide acid.

Comparative Example 5

209.14 g of N-methylpyrrolidone, 11.41 g or 0.05 mol of 4-Aminobenzoic acid 4-aminophenyl ester were added into a container and stirred until dissolved. 22.93 g or 0.05 mol of p-Phenylene bis(trimellitate) dianhydride was added into the container and stirred for 1 hour to react. 14.62 g or 0.05 mol of 1,3-Bis(3-aminophenoxy)benzene was added into the container and stirred to be dissolved. 7.76 g or 0.025 mol of bis-(3-phthalyl anhydride) ether and 13.01 g or 0.025 mol of 4,4'-(4,4'-Isopropylidenediphenoxybis(phthalic anhydride) were added into the container and stirred for 48 hours to react, thereby obtaining a block copolymer of polyamide acid.

Comparative Example 6

224.91 g of N-methylpyrrolidone, 11.41 g or 0.05 mol of 4-Aminobenzoic acid 4-aminophenyl ester were added into a container and stirred until dissolved. 22.93 g or 0.05 mol of p-Phenylene bis(trimellitate) dianhydride was added into the container and stirred for 1 hour to react. 14.62 g or 0.05 mol of 1,3-Bis(3-aminophenoxy)benzene was added into the container and stirred until dissolved. 26.02 g or 0.05 mol of 4,4'-(4,4'-Isopropylidenediphenoxybis(phthalic anhydride) was added into the container and stirred for 48 hours to react, thereby obtaining a block copolymer of polyamide acid.

Comparative Example 7

233.92 g of N-methylpyrrolidone, 5.71 g or 0.025 mol of 4-Aminobenzoic acid 4-aminophenyl ester, and 8.71 g or 0.025 mol of Bis(4-aminophenyl)terephthalate were added into a container and stirred until dissolved. 22.93 g or 0.05 mol of p-Phenylene bis(trimellitate) dianhydride was added into the container and stirred for 1 hour to react. 14.62 g or 0.05 mol of 1,3-Bis(3-aminophenoxy)benzene was added into the container and stirred until dissolved. 26.02 g or 0.05 mol of 4,4'-(4,4'-Isopropylidenediphenoxybis(phthalic anhydride) was added into the second container and stirred for 48 hours to react, thereby obtaining a block copolymer of polyamide acid.

Comparative Example 8

246.68 g of N-methylpyrrolidone, 5.71 g or 0.025 mol of 4-Aminobenzoic acid 4-aminophenyl ester, and 12.96 g or 0.025 mol of 2,2-Bis[4-(4-aminophenoxy)phenyl]hexafluoropropane were added into a container and stirred until dissolved. 22.93 g or 0.05 mol of p-Phenylene bis(trimellitate) dianhydride was added into the container and stirred for 1 hour to react. 14.62 g or 0.05 mol of 1,3-Bis(3-aminophenoxy)benzene was added into the container and stirred until dissolved. 26.02 g or 0.05 mol of 4,4'-(4,4'-Isopropylidenediphenoxybis(phthalic anhydride) was added into the container and stirred for 48 hours to react, thereby obtaining a block copolymer of polyamide acid.

Fourteen test samples were made. Each of the fourteen test samples comprises a copper foil and a polyimide film made by cyclizing the block copolymer of polyamide acid of the examples 1, 2, 3, 4, and 5, and the comparative examples 1, 2, 3, 4, 5, 6, 7, and 8, respectively. The block copolymer of polyamide acid of the examples 1 to 5 and the comparative examples 1 to 8 were cyclized at a same temperature. The dianhydride monomers and the first diamine monomers of each block copolymer of polyamide acid of the examples (short to Ex) 1 to 5 and the comparative examples (short to Co-ex) 1 to 8 were shown in the following Table 1.

Dielectric constant $D_k$, and dielectric dissipation factor $D_f$ of each of the polyimide film formed by the block copolymer of polyamide acid of examples 1 to 5 and the block copolymer of polyamide acid of the comparative examples 1 to 8 were tested. Thermal resistance, thermal performance, and copper peeling strength of the fourteen test samples were tested. The test results were shown in the following Table 2. The thermal resistance was tested at a temperature of 288 degrees centigrade for 10 seconds, if the polyimide film did not blister and peel off, the result of the thermal resistance test is considered passing, otherwise, the result fails. The thermal performance was tested by the softening temperature (Ts) of the polyimide film.

TABLE 1

| | component/mol | | | | | | | |
|---|---|---|---|---|---|---|---|---|
| | The 1th diamine monomer | | The 2th diamine monomer | | | The 1th dianhydride monomer | The 2th dianhydride monomer | |
| | APAB | BPTP | HFBAPP | BAPP | TPE-M | TAHQ | ODPA | BPADA |
| Ex 1 | 0.05 | | | | 0.05 | 0.05 | 0.05 | |
| Ex 2 | 0.05 | | | | 0.05 | 0.05 | 0.025 | 0.025 |
| Ex 3 | 0.05 | | | | 0.05 | 0.05 | | 0.05 |
| Ex 4 | 0.025 | 0.025 | | | 0.05 | 0.05 | | 0.05 |
| Ex 5 | 0.025 | | 0.025 | | 0.05 | 0.05 | | 0.05 |
| Co-ex 1 | | | | 0.1 | | 0.1 | | |
| Co-ex 2 | 0.05 | | 0.05 | | | 0.05 | 0.05 | |
| Co-ex 3 | 0.05 | | | 0.05 | | 0.05 | 0.05 | |
| Co-ex 4 | 0.05 | | | | 0.05 | 0.05 | 0.05 | |

TABLE 1-continued

| | component/mol | | | | | | | |
|---|---|---|---|---|---|---|---|---|
| | The 1th diamine monomer | | The 2th diamine monomer | | | The 1th dianhydride monomer | The 2th dianhydride monomer | |
| | APAB | BPTP | HFBAPP | BAPP | TPE-M | TAHQ | ODPA | BPADA |
| Co-ex 5 | 0.05 | | | 0.05 | | 0.05 | 0.025 | 0.025 |
| Co-ex 6 | 0.05 | | | 0.05 | | 0.05 | | 0.05 |
| Co-ex 7 | 0.025 | 0.025 | | 0.05 | | 0.05 | | 0.05 |
| Co-ex 8 | 0.025 | | 0.025 | 0.05 | | 0.05 | | 0.05 |

TABLE 2

| | Test results | | | | |
|---|---|---|---|---|---|
| | copper peeling strength (kgf/cm) | thermal performance (288° C./ 10 sec) | Ts (° C.) | $D_k$ (10 GHz) | $D_f$ (10 GHz) |
| Ex 1 | 0.93 | PASS | 291 | 3.1 | 0.003 |
| Ex 2 | 1.01 | PASS | 287 | 3.1 | 0.003 |
| Ex 3 | 1.33 | PASS | 269 | 3 | 0.003 |
| Ex 4 | 1.12 | PASS | 274 | 3 | 0.002 |
| Ex 5 | 1.11 | PASS | 282 | 2.7 | 0.004 |
| Co-ex 1 | 1.21 | NG | 211 | 3.4 | 0.008 |
| Co-ex 2 | 0.53 | PASS | 363 | 2.9 | 0.006 |
| Co-ex 3 | 0.67 | PASS | 336 | 3.3 | 0.006 |
| Co-ex 4 | 0.72 | PASS | 325 | 3.3 | 0.007 |
| Co-ex 5 | 0.78 | PASS | 317 | 3.2 | 0.006 |
| Co-ex 6 | 0.75 | PASS | 327 | 3.2 | 0.006 |
| Co-ex 7 | 0.74 | PASS | 330 | 3.2 | 0.006 |
| Co-ex 8 | 0.67 | PASS | 336 | 3.3 | 0.006 |

According to the Table 1 and Table 2, the copper peeling strength of the polyimide films formed by the block copolymer of polyamide acid of examples 1, 2, 3, 4, and 5 are higher than the copper peeling strength of the polyimide films formed by the block copolymer of polyamide acid of comparative examples 2, 3, 4, 5, 6, 7, and 8. The softening temperature of the polyimide films formed by the block copolymer of polyamide acid of examples 1, 2, 3, 4, and 5 are lower than the softening temperature of the polyimide films formed by the block copolymer of polyamide acid of comparative examples 2, 3, 4, 5, 6, 7, and 8. The dielectric dissipation factor of the polyimide films formed by the block copolymer of polyamide acid of examples 1, 2, 3, 4, and 5 are lower than the dielectric dissipation factor of the polyimide films formed by the block copolymer of polyamide acid of comparative examples 2, 3, 4, 5, 6, 7, and 8. That is, by changing the order of the polymerization reaction between the monomers with the liquid crystal structure and the diamine monomers with the flexible structure, the peel strength, the processability, and the dielectric properties of the polyimide film may be improved.

According to comparative example 1 and comparative examples 2 to 8, it can be found that the peel strength, the softening temperature and the dielectric properties of the polyimide film may be adjusted by changing the composition and ratio of the monomers.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for manufacturing a block copolymer of polyamide acid comprising:
   providing first dianhydride monomers and second dianhydride monomers, wherein each first dianhydride monomer is p-phenylene bis(trimellitate) dianhydride; each second dianhydride monomer is 4,4'-(4,4'-isopropylidenediphenoxybis(phthalic anhydride);
   providing first diamine monomers and second diamine monomer, wherein each first diamine monomer is 4-aminophenyl-4-aminobenzoate; each second diamine monomer is 4,4'-(4,4'-isopropylidenediphenyl-1,1'-diyldioxy)dianiline;
   mixing and polymerizing the first dianhydride monomers and the second diamine monomers to form a first polyamide acid, and mixing and polymerizing the second dianhydride monomers and the first diamine monomers to form a second polyamide acid;
   undergoing a polymerization reaction between the first polyamide acid and the second polyamide acid to obtain the block copolymer of polyamide acid;
   wherein the first dianhydride monomers and the second diamine monomers are mixed in a molar ratio of 9:10 to 11:10.

2. The method for manufacturing a block copolymer of polyamide acid of claim 1, wherein the second dianhydride monomers and the first diamine monomers are mixed in a molar ratio of 9:10 to 11:10.

* * * * *